March 28, 1967 R. R. RUDOLPH ETAL 3,311,051
WORKPIECE SUPPORTING AND REGISTERING APPARATUS
FOR BOTTLE DECORATING APPARATUS
Filed March 31, 1964 3 Sheets-Sheet 1

INVENTORS.
ROME R. RUDOLPH,
CARL STRUTZ, JR. and
FRANK C. STRUTZ

ATTORNEY

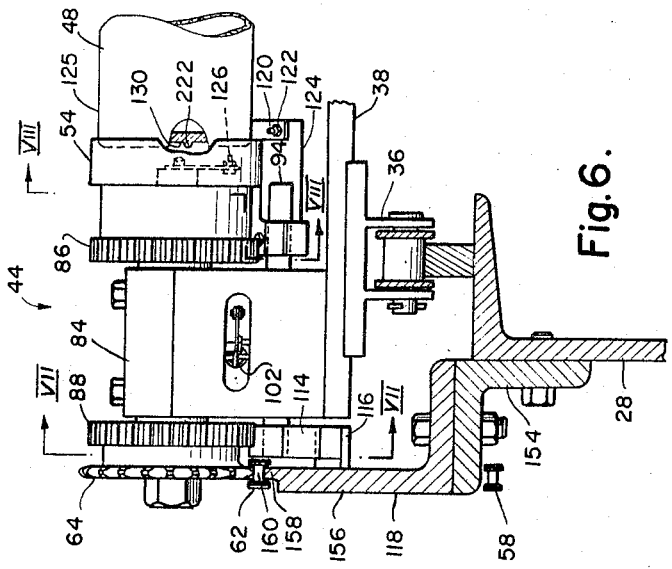

March 28, 1967
R. R. RUDOLPH ETAL
WORKPIECE SUPPORTING AND REGISTERING APPARATUS
FOR BOTTLE DECORATING APPARATUS
3,311,051
Filed March 31, 1964
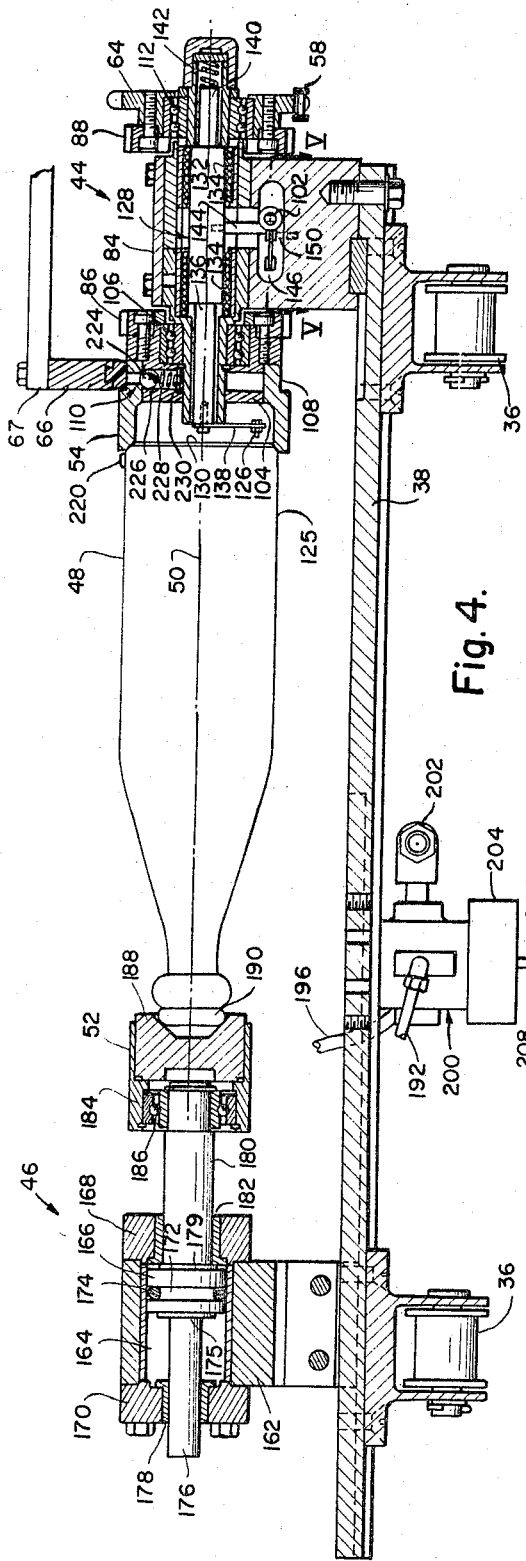
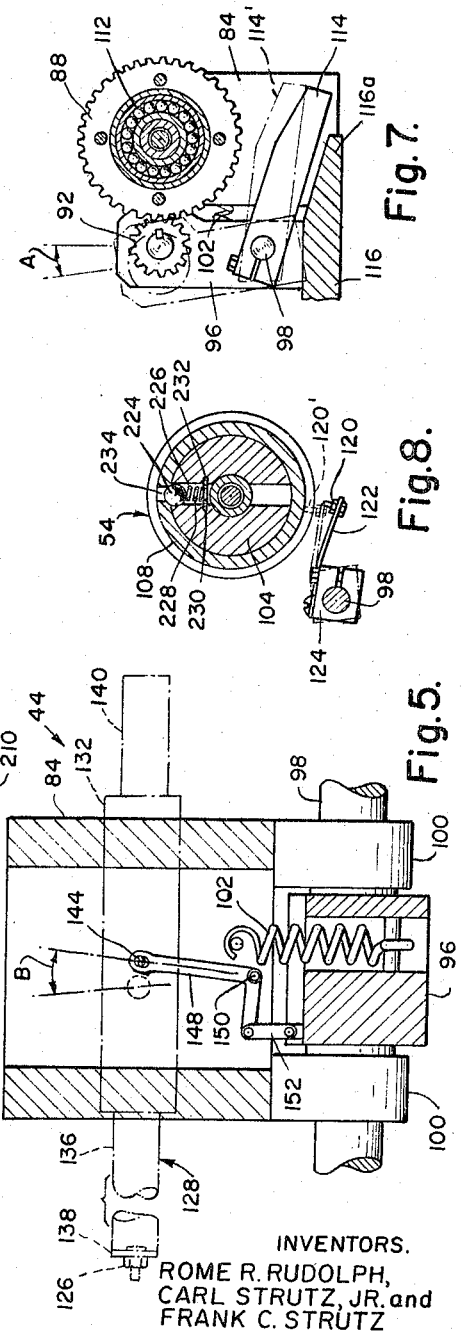
INVENTORS.
ROME R. RUDOLPH,
CARL STRUTZ, JR. and
FRANK C. STRUTZ
BY
ATTORNEY

United States Patent Office 3,311,051
Patented Mar. 28, 1967

3,311,051
WORKPIECE SUPPORTING AND REGISTERING APPARATUS FOR BOTTLE DECORATING APPARATUS
Rome R. Rudolph, Gibsonia, and Carl Strutz, Jr., and Frank C. Strutz, Mars, Pa., assignors to Carl Strutz & Co., Inc., Valencia, Pa., a corporation of Pennsylvania
Filed Mar. 31, 1964, Ser. No. 356,198
14 Claims. (Cl. 101—40)

This invention relates to apparatus for decorating generally cylindrical workpieces such as bottles and the like, and more particularly to improvements in apparatus for supporting and registering the workpieces.

Although not limited thereto, the present invention is particularly adapted for use with the decorating apparatus described in copending U.S. patent application Ser. No. 303,019, filed Aug. 19, 1963, and now abandoned, and assigned to the assignee of the present invention. In said copending application Ser. No. 303,019 there is described a workpiece decorating apparatus of the type known as a continuous motion decorating apparatus. In this apparatus, the workpieces are moved through the machine in a continuous manner and at a constant linear speed. This is a complete reversal of the intermittent motion normally associated with bottle decorating apparatus.

The decorating apparatus of the aforesaid copending application Ser. No. 303,019 comprises an endless conveyor which is driven along a path of travel at a constant linear speed. Secured at uniformly spaced points along the length of the conveyor are workpiece carrier mechanisms each comprising a neck chuck and bottom chuck which cooperate to support a workpiece for rotation about a central axis. The workpieces are transported through a registration station wherein they are oriented with respect to a decorating screen, and then through at least one decorating station wherein there is provided a stationary decorating screen and a plurality of driven squeegee elements each of which functions to transfer a decorative imprint from the screen onto the peripheral surface of a workpiece.

Since the decorating screen is stationary, each workpiece must be rotated so as to be in rolling contact with the screen during the decorating operation. To accomplish the rotation of the workpieces, the aforementioned decorating apparatus is provided with a novel drive means which, in accordance with the preferred embodiment, comprises a three-element drive. The three elements of this drive are a variable speed drive means; a roller chain mounted on the frame of the decorating apparatus along the path of travel of the workpiece and operatively connected to and driven by the variable speed drive means; and a sprocket journaled to each of the workpiece carrier mechanisms and connected to the workpiece carried thereby for rotation therewith. The drive chain is positioned beneath the sprocket so that the workpieces are rotated in a direction opposite to the travel of the conveyor. When the sprocket engages the roller chain, the workpiece is rotated at a predetermined angular velocity which is controlled by the variable speed drive means and which is determined by the diameter of the workpiece.

Accordingly, the aforesaid decorating apparatus is easily adaptable for decorating workpieces having a different diameter. That is to say, only an exchange of parts in the workpiece carrier mechanisms having dimensions corresponding to the new workpiece, is required so that the carrier mechanism will support the new workpiece. The exchange of parts normally comprises the provision of a new base cup of suitable size. The corresponding change required in the angular velocity of the new workpiece is accomplished merely by changing the linear speed of the roller chain through the variable speed drive means as explained in the aforesaid copending application Ser. No. 303,019.

It should be evident from this brief description that the production rate of the aforesaid decorating apparatus is considerably higher than the production rates of any decorating apparatus heretofore available. Because of this relatively high production rate, the pickup and discharge from the workpiece carrier mechanism must be quickly and accurately accomplished. Furthermore, the registration of each workpiece prior to being decorated must also be quickly and accurately accomplished. The workpiece carrier mechanisms and the registration apparatus disclosed in the aforesaid copending application Ser. No. 303,019 accomplish their intended functions in a satisfactory manner. However, as a primary object, the present invention seeks to provide a workpiece carrier mechanism and apparatus for registering the workpieces which are quicker and considerably more accurate and versatile in their operation than any similar apparatus heretofore available.

Other important objects of the present invention include:

To provide an improved bottom chuck having novel means for disconnecting the workpiece during its registration from the drive means which normally rotates the workpiece;

To provide novel registration apparatus having means engageable with a registration lug positioned on either the side wall of a workpiece or on the bottom wall of a workpiece;

To provide an improved workpiece carrier mechanism which may be quickly and easily adapted to receive workpieces of a different diameter; and To provide novel means for preventing binding between the aforementioned sprocket and roller chain.

In accordance with the invention there is provided an improved workpiece carrier mechanism comprising a neck chuck and a bottom chuck. As is customary, the neck chuck and bottom chuck are secured to a mounting plate for simultaneous movement along a path of travel through the decorating apparatus. A novel gear arrangement is provided on the bottom chuck which is adapted to connect and disconnect the workpiece, as required, from the aforementioned drive means which, as stated, rotates the workpiece during its decoration. Associated with this gear arrangement are registration members, one of which is adapted to engage the side wall of the workpiece and the other of which is adapted to engage the bottom wall of the workpiece. Each of the registration members is engageable with a lug formed in the workpiece, the lug being positioned at a predetermined location on the workpiece. As is normal in the bottle decorating art, the position of the lug relative to the workpiece and the position of the registration members relative to a decorating screen of the decorating apparatus cooperate to orient that surface portion of the workpiece which is to be decorated in a predetermined position with respect to the decorating screen. The provision of registration members engageable with a lug positioned either on the side wall or on the bottom wall of a workpiece enhances the versatility of the present workpiece carrier mechanism.

With respect to the adaptability of the present workpiece carrier mechanism for receiving workpieces of a different diameter, the present invention provides a base cup which is adapted to be snapped over a hub and retained thereon by means of yieldable retaining means provided on the hub. Hence, the base cups may be quickly and easily interchanged with a minimum amount of lost operating time. The base cup may be formed from any suitable material such as aluminum or steel or any suitable plastic material.

Further, in accordance with the invention, there is provided a novel means for preventing binding of the aforementioned sprocket and roller chain during the initial engagement therebetween. This means comprises resiliently displacing the roller chain, by a predetermined distance, toward the central axis of the sprocket. That is to say, that a portion of the roller chain is displaced into the path of travel of the sprocket, the arrangement being such that the roller chains will yield in a direction away from the sprocket until such time as a mating is accomplished between the sprocket teeth and the openings in the roller chain.

The above and other objects and advantages of the present invention will become apparent from the following detailed description by reference to the accompanying drawings, in which:

FIGURE 3 is an isometric view of the bottom chuck illustrated in FIGURE 2;

FIGURE 4 is a cross-sectional view, taken along the line IV—IV of FIGURE 1, illustrating the internal construction of the neck chuck and the bottom chuck of the present invention;

FIGURE 5 is a cross-sectional view taken along the line V—V of FIGURE 3;

FIGURE 6 is a side view, partly in cross-section, illustrating the relative positions of the bottom chuck, a chuck drive chain and a side frame of the decorating apparatus of FIGURE 1;

FIGURE 7 is a cross-sectional view, taken along the line VII—VII of FIGURE 6, illustrating a cam follower associated with the bottom chuck;

FIGURE 8 is a cross-sectional view, taken along the line VIII—VIII of FIGURE 6, illustrating a registering member adapted to engage the side of a workpiece;

FIGURE 9 is a fragmentary plan view of the neck chuck illustrated in FIGURE 3; and FIGURE 10 is a schematic illustration of cam members adapted to displace the neck chuck into and out of engagement with a workpiece.

DECORATING APPARATUS—GENERAL

Figures 1, 2:
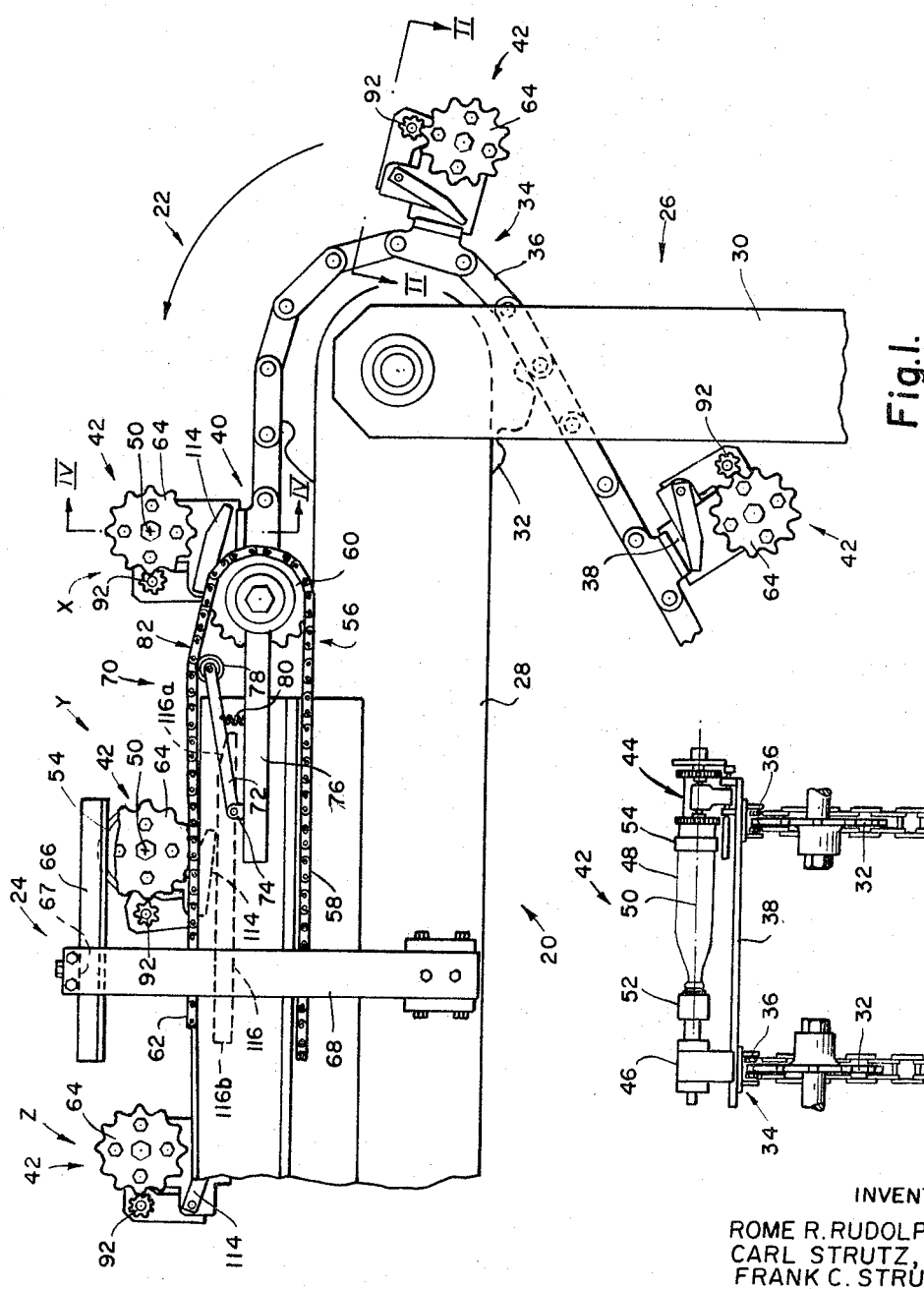
FIGURE 1 is a fragmentary side view of a decorating apparatus.
FIGURE 2 is a side view, as seen from the line II—II of FIGURE 1, illustrating a workpiece carrier assembly used in the decorating apparatus of FIGURE 1.

Referring now to FIGURES 1 and 2, there is illustrated a decorating apparatus, generally designated by the numeral 20, of which only a loading end 22 and a registration zone 24 are shown. A mechanism for loading the workpieces onto the decorating apparatus 20 is not shown since any suitable mechanism may be used, as for example, the letdown mechanism illustrated in said copending application Ser. No. 303,019.

The decorating apparatus 20 comprises, in general, a frame 26 having spaced-apart side plates 28 and end leg members 30. Journaled to the ends of the side plates 28 are drive sprockets 32 about which extend an endless conveyor means 34 which comprises a pair of conveyor chains 36 engageable with the sprockets 32 and a plurality of mounting plates 38 extending transversely across and secured to the conveyor chains 36. The conveyor means 34 has an upper reach 40 which, as fully described in said copending application Ser. No. 303,019, is driven along a horizontal path of travel at a constant linear speed, through the registration zone 24 and one or more decorating stations (not shown).

At uniformly spaced points along the length of the conveyor 34 are workpiece carrier mechanisms 42, each of which comprises a bottom chuck 44 and a neck chuck 46 secured to the opposite ends of the mounting plate 38. As can be seen in FIGURE 2, the bottom chuck 44 and the neck chuck 46 cooperate to support a workpiece, such as a bottle 48, for rotation about its central axis 50. As will more fully be described later in the specification, the neck chuck 46 is pneumatically operated and includes a neck cup 52 which is movable along the central axis 50 into and out of engagement with the neck portion of the bottle 48. The bottom chuck 44 includes a base cup 54 which is adapted to engage the bottom of the bottle 48. In this manner then, the bottle 48 is clamped between the neck cup 52 and the base cup 54 of the neck chuck 46 and base chuck 44, respectively.

Referring again to FIGURE 1, the decorating apparatus 20, as stated above, also is provided with a workpiece drive means 56 which comprises, in part, a roller chain 58 which extends around sprocket members 60 of which only one is visible. The roller chain 58 includes an upper reach 62 adapted to be engaged by sprockets 64, one each journaled to each of the bottom chucks 44 of each of the workpiece carrier mechanisms 42. The apparatus for and method of driving the roller chain are described in the aforesaid copending application Ser. No. 303,019. For the purpose of the present invention, however, it will be sufficient to state that the roller chain 58 is operatively connected to a first variable speed drive means, preferably of the positive infinitely variable type, which, in turn, is connected to a main drive means comprising a variable speed reducer connected to an electric motor. Furthermore, the conveyor means 34 also is operatively connected to a second variable speed drive means, also preferably of the positive infinitely variable type, which, in turn, is operatively connected to the variable speed reducer of the main drive means. The preferred overall arrangement is such that the first and second variable speed drive means are adjustable independently of one another. However, after the adjustments have been made, they operate in synchronism. Furthermore, since the speed of the main drive means also is variable, the speeds of operation of the first and second variable speed drive means may be varied in unison to increase or decrease the production rate of the decorating apparatus 20.

As can be seen in FIGURES 1 and 4, there is provided in the registration zone 24 an auxiliary workpiece rotating member 66 which is adapted to frictionally engage a portion of the base cup 54 and thereby rotate the bottle 48 during registration thereof. The workpiece rotating member 66 extends parallel to the path of travel of the bottles 48 and is secured to support arms 67 and 68. The arm 68, being vertical, is secured to one of the side plates 28 in a manner which permits movement of the workpiece rotating member 66 in a vertical direction, the arrangement being such that the pressure of engagement between the workpiece rotating member 66 and the base cup 54 may be adjusted.

Also provided on the decorating apparatus 20 is a means for preventing binding during the initial engagement between one of the sprockets 64 and the upper reach 62 of the roller chain 58. This means 70 comprises an arm 72 which is pivotal about one of its ends, as at 74, to a support bracket 76 to which is secured one of the sprockets 60. At the other end of the arm 72 there is rotatably supported a disc 78 which is adapted to be engaged in the lower side of the roller chain 58. A spring member 80 is secured between the arm 72 and the support bracket 76 and serves to resiliently urge the arm 72 and, hence, the roller chain 58 in an upward direction. As can be seen, the disc 78 urges a front portion 82 of the upper reach 62 of the roller chain 58 toward the central axis 50 of the sprocket members 64, i.e., into the path of travel of the sprocket teeth. Accordingly, the means 70 provides the roller chain 58 with a resiliently supported front portion 82 which will yield in a downward direction when engaged by the sprocket 64. Therefore, the sprocket 64 does not engage a rigidly mounted chain which, if the teeth of the sprocket 64 were not in proper meshing relation with the openings of the roller chain 58, would result in binding between the sprocket 64 and the roller chain 58.

BOTTOM CHUCK 44

Referring now to FIGURES 3, 4, 5 and 6, the bottom chuck 44 comprises a support block 84 which is secured to one end of the mounting plate 38 and to which are individually journaled for rotation about the central axis 50, a first gear member 86 positioned adjacent to the base cup 54 and a second gear means 88 positioned adjacent to the sprocket 64. Connecting means 90 is provided for operatively connecting the first and second gear members 86, 88 and preferably comprises a pair of spur gears 92 secured to a common shaft 94. Each of the spur gears 92 is maintained in meshing relation with one of the gear members 86, 88. The common shaft 94 is journaled in the upper end of an arm 96 which is secured at its other end to a second shaft 98 which is pivotally supported in bearing blocks 100 projecting from the support block 84. As best seen in FIGURE 5, a spring member 102 serves to connect the arm 96 to the support block 84, the arrangement being such that the spur gears 92 are biased into meshing relation with the first and second gear members 86, 88.

As can best be seen in FIGURE 4, the first gear member 86 is secured to a mounting hub 104 which, in turn, is journaled to the support block 84 by means of bearing member 106. The base cup 54 includes an annular hub 108 which is slipped over the mounting hub 104 and retained thereon by means of a yieldable retaining means 110 which will be fully described later in the specification. Hence, the first gear member 86 is connected to the base cup 54 for rotation therewith. The second gear member 88 is secured to the sprocket 64 which, in turn, is journaled to the support block 84 by means of a bearing member 112. Thus, the second gear member 88 is driven by means of the sprocket 64 and the roller chain 58. The connecting means 90, operatively connecting the first and second gear members 86, 88, serves to connect the bottle 48 in driving relation with the roller chain 58.

As best seen in FIGURES 3, 6 and 7, a cam follower 114 is secured to one end of the shaft 98 and is positioned to engage a cam member 116 secured to an angle member 118 mounted on one of the side plates 28. The cam follower 114, when engaged with a front end 116a of the cam member 116, will pivot to the position illustrated in dashed-dot outline and designated by 114'. The arm 96 also will be pivoted away from the support block 84 through an angle indicated at A in FIGURE 7. Hence, the spur gears 92 will be disengaged from the first and second gear members 86, 88 to disconnect the bottle 48 from the roller chain 58. When the cam follower 114 reaches the end 116b (see FIGURE 1) of the cam member 116, the spring member 102 will urge the arm 96 toward the support block 84 thereby re-engaging the spur gears 92 with the first and second gear members 86, 88. The disengagement and re-engagement of the spur gears 92 from and with the first and second gear members 86, 88 will occur in the region of the registration zone 24 during which the bottle 48 will be registered with respect to the decorating screen, as will be described.

As can best be seen in FIGURES 3, 6 and 8, a first stop member 120 is secured to a spring arm 122 supported on a clamping arm 124 which is detachably secured to an end of the second shaft 98. The first stop member 120 is so positioned whereby it will be pivoted into resilient engagement with a side wall 125 of the bottle 48 by means of the cooperative action of the cam follower 114 and the cam member 116. This position of engagement is illustrated in FIGURE 8 by the dash-dot outline at 120'.

As can best be seen in FIGURES 3, 4 and 5, a second stop member 126 is provided which resides within the base cup 54. The second stop member 126 is supported on the end of a rod member 128 for reciprocal straight-line movement parallel to the central axis 50 into and out of engagement with a bottom wall 130 of the bottle 48. The rod member 128 includes a central portion 132 of enlarged diameter which is supported for reciprocal straight-line movement on bearing elements 134; a first end portion 136 to which is secured a spring arm 138 resiliently supporting the second stop member 126; and a second end portion 140 the end of which is engaged with a spring member 142 positioned to urge the rod member 132 toward the bottle 48.

Means, now to be described, is provided for operatively connecting the rod member 128 with the arm 96 whereby when the arm 96 is moved away from and toward the support block 84 the rod member will be moved toward and away from the bottle 48. As best seen in FIGURES 4 and 5, a connecting rod 144 is secured to the central portion 132 of the rod member 128 and depends downwardly therefrom through the support block 84 and into a cavity 146 formed in the support block 84. A generally L-shaped connecting arm 148 resides within the cavity 146 and is pivotally supported by means of a pivot pin 150 secured to the support block 84. The connecting arm 148 is slideably connected at the end of one of its legs to the connecting rod 144 while the end of the other leg is pivotally connected to a second connecting arm 152, the other end of which is pivotally connected to the arm 96. As can be seen in FIGURE 5, movement of the arm 96 away from the support block 84 will cause the connecting arm 148 to pivot in a counterclockwise direction about the pivot pin 150 and through an angle indicated at B. The linear movement of the connecting rod 144 associated with the arcuate movement of the connecting arm 148 through the angle B is sufficient to position the second stop means 126 in resilient engagement with the bottom wall 130 of the bottle 48. Upon release of the arm 96, the spring member 102 will urge the arm 96 toward the support member 84 thereby causing the connecting arm 148 to pivot in a clockwise direction about the pivot pin 150 so as to move the rod member 128 to the right of FIGURES 4 and 5 in opposition to the spring member 142.

It should be noted at this point, that the first and second stop members 120, 126 are simultaneously moved into engagement with the respective side and bottom walls 125, 130 of bottle 48 when the cam follower 114 is pivoted by means of the cam member 116. Simultaneous with the movement of the first and second stop members 120, 126, the spur gears 92 are disengaged from the first and second gear members 86, 88. Hence, the bottle 48 is disengaged from the roller chain 58 and is freely pivotal about its central axis 50. The importance of simultaneous movement of the first and second stop members 120, 126 and the disengagement of the spur gears 92 from the first and second gear members 86, 88, will become apparent in the description of the means by which the bottles are registered with respect to the decorating screen.

WORKPIECE DRIVE CHAIN AND SPROCKET

Reference is now directed to FIGURE 6 wherein the relative positions of the drive chain 58, a supporting member for the upper reach 62 of the drive chain 58, and the sprocket 64 are illustrated. The angle member 118 is secured to the side plate 128 of the decorating apparatus 20 by means of a second angle member 154. The angle member 118 includes a vertical leg 156 in the upper end of which is formed a rib 158 upon which the link pins 160 of the roller chain 58 are supported. The angle member 118 extends from a point adjacent to one of the sprockets 60, as shown in FIGURE 1, to a point adjacent to the other sprocket 60 (not shown) at the end of the decorating apparatus 20. Thus, the upper reach 62 of the roller chain 58 is guided substantially throughout its entire length thereby prevented from being disengaged from the sprockets 64.

NECK CHUCK 46

Referring now to FIGURES 4 and 9, the neck chuck 46 comprises a housing 162 secured to the mounting plate 38 and which includes a cylindrical bore 164 in which is slideably supported a piston means 166. End plates 168, 170 are secured to the housing 162 in overlying relation with the cylindrical bore 164. The piston means 166 includes an annular groove 172 within which is positioned a sealing ring 174 preferably comprising a rubber O-ring. Extending from a first side 175 of the piston means 166 is a first rod member 176 which extends through the end plate 170 and is slideably supported on bushing 178. Extending from a second side 179 of the piston means 166 is a second rod member 180 which extends through the end plate 168 and is slideable through a bushing 182. The neck cup 52 comprises a tubular member 184, one end of which is journaled to the free end of the second rod member 180 by means of bearing member 186 and in the other end of which is retained a neck engaging member 188 which may be formed, for example, from thermoplastic resinous substances, preferably polyamides.

As can be seen by comparing FIGURES 4 and 9, the neck cup 52 is movable along the central axis 50 into engagement with a neck portion 190 of the bottle 48, as shown in FIGURE 4, and away from the bottle 48 to a position adjacent to the end plate 168, as hown in FIGURE 9. As stated above, the neck chuck 46 preferably is pneumatically operated and includes a first conduit means 192 for communicating fluid under pressure through a passageway 194 to the first side 175 of the piston means 166; and a second conduit means 196 for introducing fluid under pressure through a passageway 198 in the end plate 168 to the second side 179 of the piston means 166. The first and second conduit means 192, 196 extend from the neck chuck 46 to a valve means 200 mounted to the bottom side of the mounting plate 38. The valve means 200 also is connected to a source (not shown) of the fluid under pressure by means of a supply conduit means 202. The valve means 200 also includes a valve operator 204 which controls the introduction of the pressurized fluid through the valve means 200 into either the first or second conduit means 192, 196. The valve operator 204 includes an actuating arm 206 which when displaced in the direction indicated by the arrow 208 will cause the fluid under pressure to be introduced to the first side 175 of the piston means 166 thereby forcing the neck cup 52 into engagement with the neck portion 190 of the bottle 48, i.e., to clamp the bottle 48 between the neck cup 52 and the base cup 54. When the actuating arm 206 is displaced in a direction indicated by arrow 210, the valve means 200 will introduce fluid under pressure through the second conduit means 196 to the second side 179 of the piston means 166 thereby causing the neck cup 52 to be withdrawn from the bottle 48, i.e., to release the bottle 48 at the end of the decorating operation. It should be noted at this point, that the valve means 200 is of the type which will simultaneously introduce fluid through one of the conduits 192, 196 while exhausting fluid through the other one of the conduits 192, 196. For example, when fluid under pressure is introduced in the first conduit means 192 to the first side 175 of the piston means 166 to cause movement of the neck cup 52 toward the bottle 48, the fluid within the cylindrical bore 164 on the second side 179 of the piston means 166 will be exhausted through the conduit 196 and valve means 200 to the atmosphere.

The actuating arm 206 may be spring-biased in the depending vertical position illustrated in FIGURES 4 and 9. Hence, as schematically illustrated in FIGURE 10 a first cam means 212 is provided in the path of the actuating arm 206 and at the loading end 22 of the decorating apparatus 20. The first cam means 212, for example, may be supported by means of a bracket 214 secured to one of the side plates 28 of the decorating apparatus 20. At the unloading end of the decorating apparatus 20, there is provided a second cam means 216 also positioned in the path of travel of the actuating arm 206 and secured to one of the side plates 28 by means of a bracket 218, for example.

At the loading end of the decorating apparatus 20, the first cam means 212 will displace the actuating arm 206 in the direction indicated by the arrow 208 of FIGURE 4 so that the neck chuck will be displaced into engagement with the neck portion 190 of the bottle 48. Conversely, at the unloading end of the decorating apparatus 20, the second cam means 216 will displace the actuating arm 206 in the direction indicated by the arrow 210 of FIGURE 4, so as to displace the neck cup 52 away from the bottle 48 thereby releasing the bottle 48. It is important, of course, that the first and second cam means 212 and 216 reside in a predetermined position with respect to the loading and unloading mechanisms to insure proper loading of the bottles 48 onto the workpiece carrier mechanisms 42 and the proper discharge of the bottles 48 from the workpiece carrier mechanisms 42 at the completion of a decorating operation.

The supply conduit means 202 preferably communicates fluid under pressure simultaneously to all of the valve means 200 associated with each of the workpiece carrier mechanisms 42. Hence, the supply conduit means 202 preferably comprises an endless conduit which extends along the endless conveyor means 34. The preferred means by which fluid under pressure is supplied to the conduit 202 is described in the aforesaid copending application Ser. No. 303,019. For the purpose of the present invention, however, it will be sufficient to state that an air distributor is provided having a primary conduit which may be coiled within the air distributor and which is extendable therefrom. The free end of the main conduit will be connected at a point to the supply conduit means 202. Thus, as the conveyor means 34 is driven, the primary conduit will be coiled within the air distributor as its free end approaches the air distributor; and the primary conduit will be extended from the air distributor as its free end recedes from the air distributor.

REGISTRATION OF WORKPIECES

After each bottle 48 is deposited on a workpiece carrier mechanism 42, it is transported through the registration zone 24 (see FIGURE 1) in a continuous manner and wherein it is rotated about its central axis 50 into a predetermined orientation with respect to the decorating screens (not shown). When the workpiece 48 has attained this predetermined orientation, it is prevented from rotating until it leaves the registration zone 24.

It is a normal practice to provide small projections or lugs on each of the workpieces 48 which are formed or cast therein at a suitable location. The lugs facilitate precise locating of the workpieces with respect to the screens for registration of single or successive decorating imprints. As can be seen in FIGURE 4, the bottle 48 is provided with a lug 220 formed in the side wall 125 adjacent the bottom thereof. When the bottle 48 is rotated, the lug 220 will be moved into engagement with the first stop member 120. As can be seen in FIGURE 6, the bottle 48 alternatively may be provided with a lug 222 formed in the bottom wall 130 and positioned therein so as to be engaged by the second stop member 126.

The method of registering the workpieces 48 now will be described by reference to FIGURES 1, 4 and 6. Illustrated in FIGURE 1 are three workpiece carrier assemblies 42 which are designated by the letters X, Y and Z. The carrier mechanism X is approaching the roller chain 58 so that the sprocket 64 thereof is about to engage the roller chain 58. After engaging the roller chain 58, the workpiece carrier mechanism 42 proceeds along the aforementioned path of travel with the conveyor means 34 until the cam follower 114 thereof engages the cam member 116. The forward end portion 116a of the cam member 116 is so positioned whereby the connecting gears 92 will be disengaged from the first and second gear members 86, 88, prior to the engagement of the auxiliary workpiece rotating member 66 with the annular hub 108 of the base cup 54.

Thereafter, the workpiece carrier mechanisms will proceed until the auxiliary workpiece rotating member 66 engages the annular hub 104 of the base cup 54 so as to rotate the workpiece 48 in a clockwise direction, as illustrated by the mechanism generally designated by the letter Y. During the rotation of the bottle 48, one of the stop members 120, 126 will engage one of the lug members 220 or 222, depending upon where the lug member is positioned on the bottle 48. When the stop member engages the lug, the bottle 48 is prevented from rotating, i.e., the stop member provides a stopping force sufficient to overcome the frictional engagement between the auxiliary workpiece rotating member 66 and the annular hub 108 of the base cup 54. It should be noted that the length of the auxiliary workpiece rotating member 66 is greater than the circumference of the annular hub 108 of the base cup 54. Hence, the workpiece 48 will, in the absence of the stopping members, undergo more than one revolution, the arrangement being such that regardless of their relative positions, a lug member will be rotated into engagement with a stop member prior to the disengagement of the auxiliary workpiece rotating member 66 with the base cup 54.

As can be seen in FIGURE 1, the other end portion 116b of the cam member 116 preferably is positioned so as to cause the re-engagement of the spur gears 92 with the first and second gear members 86, 88 just after the disengagement of the auxiliary workpiece rotating member 66 with the base cup 54. The workpiece carrier mechanism 42, generally designated by the letter Z, supports a bottle 48 which has been registered with respect to the decorating screen (not shown) and which is being rotated in clockwise direction by means of the sprocket 64 and chain 58, at the required angular velocity.

It should be noted at this time that the sprocket 64 of each carrier mechanism 42 is always engaged with the roller chain 58 during its passage through the registration zone and the subsequent decorating stations. Hence, upon the disengagement of the cam follower 114 from the cam member 116, the second gear member 88 will be connected in driving relation with the first gear member 86 whereby the workpiece 48 is rotated at the required angular velocity.

DETACHABLE BASE CUP 54

Reference is now directed to FIGURES 3 and 8 wherein the construction of the yieldable retaining means 110 is illustrated. As stated above, the yieldable retaining means 110 serves to detachably secure the base cup 54 to the mounting hub 104 of the support block 84 so that the base cup 54 may be quickly and easily detached from the mounting hub 104 and replaced by another base cup which is adapted to receive a bottle having a different diameter. As can be seen, the yieldable retaining means 110 comprises a ball member 224 which is retained within a cylindrical opening 226 formed in the mounting hub 104. A spring member 228 is disposed within the cylindrical opening 226 and is engaged at one end with the ball member 224 and at the other end with a snap ring 230 retained within an annular groove 232 formed in the mounting hub 104. The annular hub 108 of the base cup 54 is provided with an opening 234 having a diameter which is less than the diameter of the ball member 224. When the annular hub 108 is slipped over the mounting hub 104, the ball member 224 is depressed below the arcuate surface of the mounting hub 104 until the opening 234 is positioned in overlying relation therewith. The ball member 224 thereafter is urged to project into the opening 234 by means of the spring member 226. Hence, the base cup 54 is detachably secured to the mounting hub 104 of the support block 84. It should be evident then that in the present workpiece carrier mechanisms 42, the base cups 54 may be quickly and easily interchanged with other base cups which are adapted to receive bottles having a different diameter.

Although the present invention has been shown in connection with a specific embodiment, it will be readily apparent to those skilled in the art that various changes in form and arrangement of parts may be made to suit requirements without departing from the spirit and scope of the present invention.

We claim as our invention:

1. In a carrier mechanism comprising a neck chuck and a bottom chuck mounted for simultaneous movement along a path of travel, said neck chuck and said bottom chuck supporting a generally cylindrical workpiece therebetween for rotation about its central axis, the improvement in said bottom chuck comprising: a support block; first gear means journaled to said support block for free rotation about said central axis; means connecting said workpiece to said first gear means for rotation therewith; driving gear means journaled to said support block; drive means for rotating said driving gear means; connecting gear means movably mounted on said support block for rotation about an axis spaced apart from and parallel to said central axis; means resiliently urging said connecting gear means into meshing relation with said first gear means and said driving gear means; and means for temporarily disengaging said connecting gear means from said first gear means during a portion of the travel of said carrier mechanism along said path of travel.

2. In a carrier mechanism comprising a neck chuck and a bottom chuck mounted for simultaneous movement along a path of travel, said neck chuck and said bottom chuck cooperating to support a generally cylindrical workpiece therebetween for rotation about its central axis, the improvement in said bottom chuck comprising: a support block; first gear means journaled to said support block for free rotation about said central axis; means connecting said workpiece to said first gear means for rotation therewith; driving gear means journaled to said support block; drive means for rotating said driving gear means; connecting gear means mounted on said support block for rotation about an axis spaced apart from and parallel to said central axis; means resiliently urging said connecting gear means into meshing engagement with said first gear means and said driving gear means; and cam means for temporarily disengaging said connecting gear means from said first gear means during a portion of the travel of said carrier mechanism along said path of travel.

3. In a carrier mechanism comprising a neck chuck and a bottom chuck mounted for simultaneous movement along a path of travel, said neck chuck and said bottom chuck cooperating to support a generally cylindrical workpiece therebetween for rotation about its central axis, the improvement in said bottom chuck comprising: a support block; first gear means journaled to said support block for free rotation about said central axis; means connecting said workpiece to said first gear means for rotation therewith; driving gear means journaled to said support block; drive means for rotating said driving gear means; connecting gear means; an arm rotatably supporting said connecting gear means at one end thereof, said arm being pivotally mounted at its other end to said support block whereby said connecting gear means are movable into and out of meshing engagement with said first gear means and said driving gear means; means resiliently urging said arm toward said support block; and means for temporarily moving said arm away from said support block whereby said connecting gear means is disengaged from said first gear means during a portion of the travel of said carrier mechanism along said path of travel.

4. The improvement of claim 3 wherein said means resiliently urging said arm toward said support block comprises a spring having one end connected to said arm and the other end connected to said support block.

5. The improvement of claim 1 wherein said means connecting said workpiece to said first gear means comprises a mounting hub secured to said first gear means; a base cup including an annular hub at one end thereof engaged over said mounting hub and an annular beveled face of predetermined diameter at the other end thereof adapted to engage the bottom of said workpiece; and yielding means on one of said hubs for releasably connecting said base cup to said mounting hub.

6. In a carrier mechanism comprising a neck chuck and a bottom chuck mounted for simultaneous movement along a path of travel, said neck chuck and said bottom chuck cooperating to support a generally cylindrical workpiece therebetween for rotation about its central axis, the improvement in said bottom chuck comprising: a support block; first and second spaced-apart gear means individually journaled to said support block for rotation about said central axis; a base cup connecting said workpiece to said first gear means for rotation therewith; drive means for driving said second gear means; a pair of connecting gears; an arm rotatably supporting said connecting gears at one end thereof, each of said connecting gears being engaged with one of said first and second gear means, said arm being pivotally mounted at its other end to said support block whereby said connecting gears are movable into and out of meshing engagement with first and second means connecting said arm to said support block for resiliently urging said connecting gears into meshing relation with said first and second gear means; and means for temporarily pivoting said arm away from said support block whereby said connecting gear means are disengaged from said first and second gear means during a portion of the travel of said carrier mechanism along said path of travel.

7. The improvement of claim 3 wherein said arm is secured to a shaft, said shaft being journaled to said support block and extending parallel with said central axis.

8. In decorating apparatus having a frame, endless conveyor means supported on said frame and driven along a path of travel through a registration station and at least one decorating station, a plurality of carrier mechanisms each comprising a neck chuck and a bottom chuck mounted on said endless conveyor means for simultaneous movement therewith along said path of travel and cooperating to support generally cylindrical workpieces therebetween for rotation about their central axes, the improvement in said bottom chuck comprising: a support block; first gear means journaled to said support block for free rotation about said central axis; means connecting said workpiece to said first gear means for rotation therewith; driving gear means journaled to said support block; drive means for rotating said driving gear means; connecting gear means for transmitting power from said driving gear means to said first gear means; an arm rotatably supporting said connecting gear means at one end thereof; a shaft journaled to said support block and being spaced apart from and parallel with said central axis; said arm being secured to said shaft whereby said connecting gear means are movable into and out of meshing engagement with said first gear means and said driving gear means; means connecting said arm to said support block for resiliently urging said connecting gear means into engagement with said first gear means and said driving gear means; and means for temporarily pivoting said arm away from said support block whereby said connecting gear means is disengaged from said first gear means during the registration of said workpiece.

9. The improvement of claim 8 wherein said drive means comprises chain means rotatably supported on said frame and extending beyond said registration station and said decorating station; a sprocket secured to said driving gear means and meshing with said chain means; and variable speed drive means operatively connected to said chain means for driving said chain means at a preselected linear speed.

10. The improvement of claim 8 including means positioned in said registration station for rotating said workpiece only when said first gear means is disengaged from said connecting gear means.

11. In a bottom chuck adapted to cooperate with a neck chuck for supporting a generally cylindrical workpiece for rotation about its central axis during decoration by means of cooperating squeegee and decorating screen elements, said neck chuck and said bottom chuck being mounted for simultaneous movement along a path of travel, and said workpiece having a lug disposed at a predetermined point on its side wall, the improvement comprising: a support block; a pair of gear means journaled to said support block; one of said gear means being connected with said workpiece for rotating the same about its central axis; drive means for driving the other of said gear means; shaft means journaled to said support block, said shaft means being spaced apart from said central axis and parallel therewith; an arm secured to said shaft means for arcuate movement therewith; means resiliently urging said arm means toward said support block; connecting gear means journaled to said arm and engaged with said pair of gear means for transmitting power from said drive means to said workpiece; means for pivoting said arm temporarily away from said support block to disconnect said pair of gear means from said connecting gear means whereby said workpiece is freely rotatable about its central axis; stop means resiliently supported at that end of said shaft means adjacent to said workpiece and in the path of travel of said lug, said stop means being displaced into engagement with the periphery of said workpiece when said arm is pivoted away from said support block; and means for rotating said workpiece when engaged by said stop means until said lug is rotated into engagement with said stop means, said workpiece being stopped at a predetermined position with respect to the decorating screen.

12. In a bottom chuck adapted to cooperate with a neck chuck for supporting a generally cylindrical workpiece for rotation about its central axis during decoration by means of cooperating squeegee and decorating screen elements, said neck chuck and said bottom chuck being mounted for simultaneous movement along a path of travel, and said workpiece having a lug disposed on the bottom surface thereof and at a predetermined position thereon, the improvement in said bottom chuck comprising: a support block; a pair of gear means journaled to said support block; one of said gear means being connected to said workpiece for rotating the same about its central axis; drive means for driving the other of said gear means; connecting means operatively connecting said pair of gear means in torque-transmitting relation; means for temporarily disengaging said connecting means from said pair of gear means whereby said workpiece is freely rotatable about its central axis; stop means supported for straight-line reciprocal movement into and out of surface engagement with the bottom of said workpiece; means operable when said connecting means operatively connect said pair of gear means for moving said stop means away from said workpiece; means operable when said connecting means are disengaged from said pair of gear means for urging said stop means into surface engagement with said workpiece; and means for rotating said workpiece when engaged by said stop means until said lug is rotated into engagement with said stop means; said workpiece being stopped at a predetermined position with respect to the decorating screen.

13. In a bottom chuck adapted to cooperate with a neck chuck for supporting a generally cylindrical workpiece for rotation about its central axis during decoration by means of cooperating squeegee and decorating screen elements, said neck chuck and said bottom chuck being mounted for simultaneous movement along a path of travel, and said workpiece having a lug disposed at a predetermined position on its bottom wall and projecting therefrom, the improvement in said bottom chuck comprising: a support block; a pair of gear means journaled to said support block; one of said gear means being connected to said workpiece for rotating the same about its central axis; drive means for driving the other of said pair of gear means; connecting means operatively connecting said pair of gear means in torque-transmitting relation; means for temporarily disengaging said connecting means from said pair of gear means whereby said workpiece is freely rotatable about its central axis; rod means journaled for straight-line reciprocal motion toward and away from the bottom of said workpiece and along said central axis; stop means resiliently supported on that end of said rod means adjacent to the bottom of said workpiece; means for moving said stop means away from said workpiece when said connecting means operatively connect said pair of gear means; means operable when said connecting means are disengaged from said pair of gear means for urging said stop means into surface engagement with the bottom of said workpiece; and means for rotating said workpiece when engaged by said stop means until said lug is rotated into engagement with said stop means; said workpiece being stopped at a predetermined position with respect to the decorating screen.

14. In a bottom chuck adapted to cooperate with a neck chuck for supporting a generally cylindrical workpiece for rotation about its central axis during decoration by means of cooperating squeegee and decorating screen elements, said neck chuck and said bottom chuck being mounted for simultaneous movement along a path of travel, the improvement in said bottom chuck comprising: a support block; a pair of gear means journaled to said support block; one of said gear means being connected to said workpiece for rotating the same about its central axis; drive means for driving the other of said gear means; connecting means for operatively connecting said pair of gear means in torque-transmitting relation; arm means pivotally mounted on said support block and rotatably supporting said connecting means; means for temporarily pivoting said arm means away from said support block to disconnect said connecting means from said pair of gear means whereby said workpiece is freely rotatable about its central axis; first stop means resiliently connected to said arm means and movable into surface engagement with a surface of the side wall of said workpiece when said arm means is pivoted away from said support block; second stop means supported on said support block for straightline reciprocal movement into and out of engagement with a surface of the bottom wall of said workpiece; means connecting said second stop means with said arm means for causing movement of said second stop means into and out of surface engagement with said workpiece when said arm means is moved away from and toward said support block; and means for rotating said workpiece when engaged by said stop means; said workpiece including a lug on one of said surfaces and positioned for engagement by one of said stop means to stop the rotation of said workpiece; said workpiece being stopped at a predetermined position with respect to the decorating screen.

References Cited by the Examiner
UNITED STATES PATENTS

| 751,783 | 2/1904 | Collin | 101—38 |
|---|---|---|---|
| 2,015,669 | 10/1935 | Gravely et al. | 101—38 |
| 2,132,818 | 10/1938 | Cone | 101—115 |
| 2,720,162 | 10/1955 | Currivan et al. | 101—37 X |
| 3,146,704 | 9/1964 | Johnson | 101—126 |
| 3,232,225 | 2/1966 | Berthold et al. | |
| 3,237,555 | 3/1966 | Jones et al. | 101—126 X |

ROBERT E. PULFREY, *Primary Examiner.*

W. F. McCARTHY, *Assistant Examiner.*